(12) United States Patent
Adler et al.

(10) Patent No.: US 6,386,423 B1
(45) Date of Patent: *May 14, 2002

(54) SOLDERING IRON TIPS

(75) Inventors: Paul H. Adler, Livermore; Ronald W. LaValley, Belmont; Mark Cowell, San Carlos, all of CA (US)

(73) Assignee: Delaware Capital Formation, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/798,467

(22) Filed: Feb. 10, 1997

(51) Int. Cl.⁷ ................................................ B23K 3/02
(52) U.S. Cl. ...................................... 228/54; 228/51
(58) Field of Search ........................... 228/54, 51, 55; 219/229; 148/403

(56) References Cited

U.S. PATENT DOCUMENTS

| | | | |
|---|---|---|---|
| 3,099,084 A | | 7/1963 | Thuillier |
| 3,245,599 A | * | 4/1966 | Johnson ........................ 228/54 |
| 3,315,350 A | | 4/1967 | Kent |
| 3,592,378 A | * | 7/1971 | Petraglia ...................... 228/51 |
| 3,669,334 A | | 6/1972 | Meisterling |
| 3,899,114 A | * | 8/1975 | Kleeberg ...................... 228/55 |
| 3,917,148 A | | 11/1975 | Runyon |
| 3,934,293 A | | 1/1976 | Lee |
| 3,986,653 A | | 10/1976 | Gilding |
| 4,055,744 A | | 10/1977 | Fortune |
| 4,058,865 A | | 11/1977 | Lee |
| 4,473,181 A | * | 9/1984 | Grabow, Jr. ................. 228/51 |
| 4,500,027 A | | 2/1985 | Nakajima |
| 4,544,829 A | * | 10/1985 | Adachi et al. ............. 219/237 |
| 4,560,101 A | * | 12/1985 | Wilhelmson et al. ......... 228/54 |
| 4,648,608 A | * | 3/1987 | Smith ......................... 279/1 K |
| 4,795,076 A | * | 1/1989 | Gottschild .................... 228/54 |
| 4,830,260 A | * | 5/1989 | Kent ............................ 228/54 |
| 4,974,768 A | * | 12/1990 | Ebata .......................... 228/54 |
| 5,146,668 A | | 9/1992 | Gulistan |

FOREIGN PATENT DOCUMENTS

| | | | |
|---|---|---|---|
| CA | 686477 | 5/1964 | |
| EP | 0 272 371 | 6/1988 | |
| GB | 487178 | * 6/1938 | ................. 228/54 |

* cited by examiner

Primary Examiner—Tom Dunn
Assistant Examiner—Zidia Pittman
(74) Attorney, Agent, or Firm—Burns Doane Swecker & Mathis, L.L.P.

(57) ABSTRACT

A technique for producing soldering iron tips entails cutting clad wire into a plurality of segments, each segment comprising a core of material (such as copper) and an outer protective layer (such as stainless steel, Ni, Cr, or alloy thereof). Each clad wire segment is then shaped into a soldering iron tip by a cold or hot heading process, or other metal forming process. In the finished tip, the protective outer layer is disposed behind the working area of the tip, and serves to reduce the corrosion of the tip, and to improve the electrical conductivity between the tip and the soldering iron handle. A heater element can be formed at one end of the soldering iron tip from the same clad wire segment used to produce the tip itself, thereby ensuring good thermal transfer properties between the heater element and the tip. The invention also pertains to a technique for forming a protective outer layer on the working area of the tip. The technique comprises stamping caps from a thin strip or sheet of protective material, such as iron. More specifically, the caps are stamped out of the sheet using a die having a shape which resembles the shape of the working area of the soldering tip. The caps formed in this manner are then inserted over the ends of the tips, and attached thereto by applying brazing material to the formed cap or to the strip of material prior to forming the cap.

11 Claims, 5 Drawing Sheets

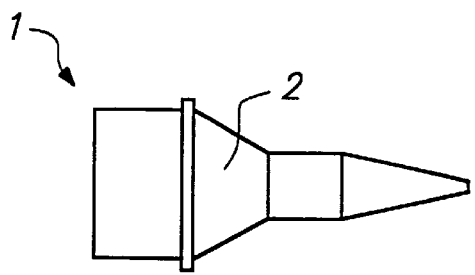
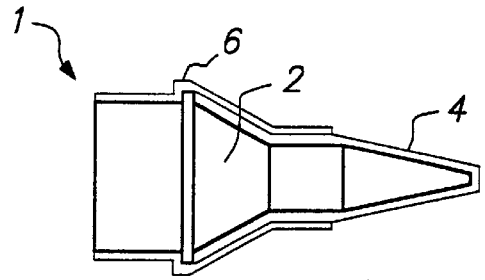
FIG. 1
(PRIOR ART)
FIG. 2
(PRIOR ART)
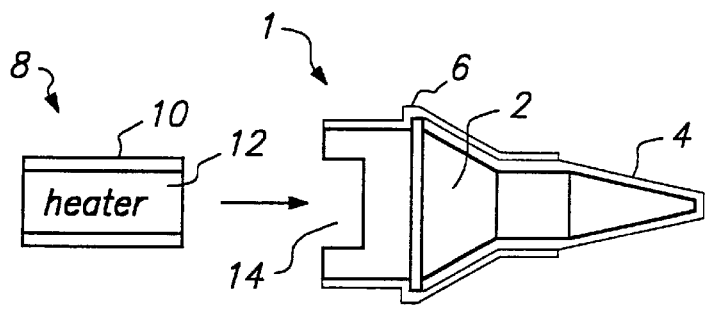
FIG. 3
(PRIOR ART)
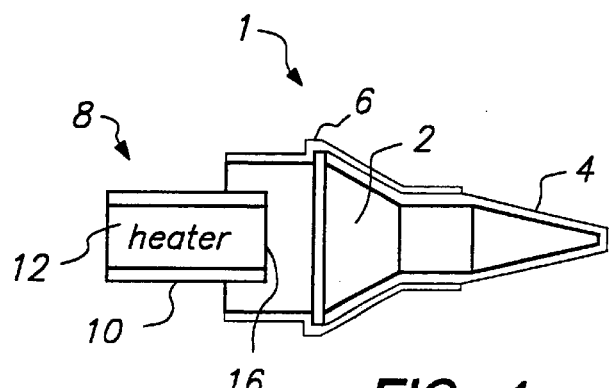
FIG. 4
(PRIOR ART)

SOLDERING IRON TIPS

BACKGROUND OF THE INVENTION

The present invention relates to techniques for making soldering iron tips having protective outer layers, and the tips produced thereby, Manufacturers of soldering irons (as well as desoldering irons) typically use copper (Cu) or copper-based materials for the tip of the soldering iron. Copper offers high thermal conductivity at relatively low cost. Moreover, copper can be readily machined into the desired tip geometry. For example, FIG. 1 illustrates an exemplary tip 1 formed by machining a monolithic rod of copper or a copper alloy. 2.

However, copper tips also have a number of undesirable properties. When heated to the high temperatures required for soldering, the tips may dissolve in the solder and/or corrode in air. Furthermore, the tips may deform when mechanical pressure is applied thereto. For this reason, simple copper-based soldering tips have a relatively low tip life.

The prior art has addressed this problem by coating the copper tips with one or more outer layers. More specifically, as illustrated in FIG. 2, the end of the tapered portion of the tip 1 (referred to as the "working area") is coated with an outer layer 4 of iron (Fe). The iron coating 4 protects the softer copper core 2 from deformation during soldering operations, and from dissolving in the solder. Iron is also readily wettable by molten solder. The remainder of the soldering iron tip 1 is covered by other types of materials 6, such as a layer of chromium (Cr) or a layer of chromium formed over a layer of nickel (Ni). These layers 6 provide a good electrical connection between the tip of the soldering iron and ground, thus ensuring a low tip-to-ground voltage potential and resistance. These layers 6 also protect the copper 2 from corroding in air. Furthermore, chromium offers poor wettability by the solder and thereby prevents the solder from creeping up the tip from the working area and degrading the performance of the soldering iron tip.

Typically, these materials are coated onto the copper tip by a deposition technique known as electroless plating or electroplating. Electroplating involves applying a voltage between the soldering iron tip (cathode), and pieces of the metal to be deposited (the anode), through an acid-based aqueous electrolyte. The soldering iron tip and the metal anode are both submersed in the electrolyte. The applied voltage causes metal ions to flow from the anode to the cathode (soldering iron tip) through the electrolyte, thus depositing the metal onto the tip of the soldering iron in a controlled fashion. For example, U.S. Pat. No. 3,315,350 proposes a technique for electroplating a layer of iron on a copper tip, and then electroplating an additional layer of nickel and chromium on the iron layer. U.S. Pat. No. 3,986,653 proposes electroplating an outer layer of osmium or ruthenium (or an alloy thereof) on a soldering iron tip.

Electroplating of copper soldering iron tips has disadvantages. First, electroplating sometimes produces a coating of uneven thickness on the tip, especially at regions where the contour of the tip abruptly changes. Second, the process itself is inherently unstable, resulting in differences in plating thickness and quality from one production batch to the next. Third, electroplating is relatively expensive, which is partially due to the large amount of manual labor required by the technique, and the need to dispose of the chemical solutions used in the process in an environmentally safe manner.

For these reasons, some manufacturers have looked to alternative ways of constructing tips having hardened outer layers. For example, U.S. Pat. No. 4,055,744 discloses a technique for forming a hardened outer layer on the working area of a soldering tip by separately forming an iron cap, and then mechanically crimping the cap onto the soldering iron tip. The composite structure of the cap and the tip is further shaped by manually hammering the composite structure, or by using a swaging machine. While avoiding the problems associated with electroplating, crimping the cap to the copper tip may tightly bind the cap to the tip only at selective locations of the tip, such as at the base of the tip, thereby reducing the contact area between the tip and the cap. This, in turn, may reduce the transfer of heat from the tip to the cap, thus reducing the performance or the efficiency of the soldering iron.

Another problem addressed by the present invention pertains to soldering irons which include "heater" elements. As illustrated in FIGS. 3 and 4, a heater 8 is the component of the soldering iron which actually generates heat. That is, the electrical coils of the soldering iron (not shown) transfer energy to the heater 8, which in turn transfers heat to the working area of the soldering iron tip 1. In one tip design produced by the assignee of the present invention, the heater 8 element comprises a clad wire segment having an inner core 12 and an outer layer 10 formed thereon. The heater element 8 is press fit into a machined hole 14 located in the back of the tip 1. The mechanical interface 16 (in FIG. 4) between the heater 8 and the tip 1 impedes the transfer of heat from the heater 8 to the tip 1.

It is therefore an exemplary objective of the present invention to provide a technique for making soldering iron tips that facilitates efficient and reliable large-scale production of the tips, preferably without the use of electroplating. It is a further exemplary objective of the present invention to provide a technique for making soldering iron tips which does not impose interfaces which impede the flow of heat from the heater to the tip.

SUMMARY OF THE INVENTION

These and other exemplary advantageous features are achieved according to a first aspect of the invention which entails producing a tip from a clad wire segment. The technique entails cutting a length of clad wire into a plurality of segments, where each segment comprises a core of material (such as copper) and an outer protective layer (such as stainless steel, nickel of high purity, chromium of high purity, Fe—Ni alloys such as Invar-type alloys, or other suitable material). Each clad wire segment is then shaped into a soldering iron tip by a cold heading process, or other metal forming process. In the finished tip, the outer protective layer is disposed "behind" the working area of the tip, and provides good electrical conductivity between the tip and ground, thus maintaining a low tip-to-ground voltage potential and resistance. The outer layer also protects the inner core (of copper) from oxidation, and offers poor wettability, which prevents solder from adhering thereto.

According to another aspect of the invention, the clad wire segment can be further shaped to form an integrated heater element located on one end of the tip. Since the heater element is formed from the same segment of the clad wire segment as the tip itself, this technique ensures metallurgical continuity between the heater and the working area of the tip, and thereby improves the transfer of heat between the heater and the tip by eliminating the mechanical interface 16 shown in FIG. 4.

According to another aspect of the invention, the above described metal forming steps can be performed on a wire (or rod) segment which does not include a protective outer layer.

According to still another aspect of the invention, a protective outer layer for the working area of the soldering iron tip can be formed by inserting a separately formed cap of iron (or like material) over the working area portion of the tip. More specifically, the technique entails producing a thin strip or sheet of protective layer material, such as iron. Tapered caps are then stamped out of the sheet using a die having a shape which resembles the shape of the soldering iron tip. The caps formed in this manner are then inserted over the working area of the soldering iron tips, and attached thereto by applying brazing material to the caps or the tips and then melting or sintering the brazing material. Alternatively, the brazing material can be applied directly to the strip of material (before stamping is performed) to further expedite the manufacturing process. In either event, the use of brazing, or like technique, improves the thermal conductivity between the tip and the cap by creating an intimate metallurgical bond between the tip and the cap, as compared with the prior art technique of crimping the cap to the tip.

According to another aspect of the present invention, a clad wire or rod segment is used to form a soldering tip including one or more protective outer layers on the working area of the soldering tip.

BRIEF DESCRIPTION OF THE DRAWINGS

The foregoing, and other, objects, features and advantages of the present invention will be more readily understood upon reading the following detailed description in conjunction with the drawings in which:

FIG. 1 shows a machined soldering iron tip according to the prior art;

FIG. 2 shows a machined soldering iron tip with layers of material deposited thereon through the use of electroplating, according to the prior art;

FIG. 3 shows a machined soldering iron tip including a machined hole in its back to receive a heater element, according to the prior art;

FIG. 4 shows a machined soldering iron tip with a heater element press fit into a machined hole in the back of the tip, according to the prior art;

DETAILED DESCRIPTION OF THE INVENTION

In the following description, for purposes of explanation and not limitation, specific details are set forth in order to provide a thorough understanding of the invention. However, it will be apparent to one skilled in the art that the present invention may be practiced in other embodiments that depart from these specific details. In other instances, detailed descriptions of well-known methods and devices are omitted so as not to obscure the description of the present invention with unnecessary detail.

Further, for the sake of brevity, the ensuing discussion is framed in the context of soldering irons. However, the principles disclosed herein are equally applicable to desoldering irons. Desoldering irons heat and remove previously applied solder.

1. Formation of a Soldering Iron Tip Using a Clad Wire Segment or Rod

Figure 5:
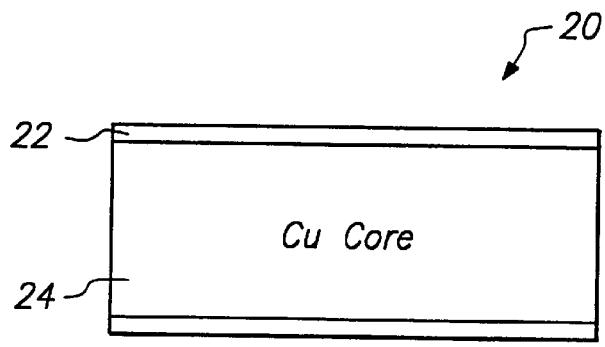
FIGS. 5–8 show the transformation of a clad wire segment to a soldering tip having a protective outer coating according to a first embodiment of the present invention.

A first exemplary embodiment produces the soldering iron tips (or desoldering iron tips) from clad wire or a clad rod. As shown in FIG. 5 in a cross-section depiction, a clad wire (or rod) segment 20 comprises a core of material 24, on which another electrically conductive protective layer 22 is metallurgically bonded. The core material 24 may comprise a metal such as copper of high purity, such as copper alloy Nos. C10100 or C10200 having copper contents of 99.99% Cu and 99.95% Cu, respectively. To promote machinability of the core, copper alloy containing tellurium can be used, such as copper alloy No. C14500 (comprised of 99.5% Cu, 0.5% Te and 0.008% P). The protective layer 22 can comprise, but is not limited to, high purity nickel, high purity chromium, or some alloy thereof, such as Fe—Ni (e.g. Invar-type alloys), Fe—Ni—Cr, or other suitable material. The layer 22 can also comprise stainless steel. According to one exemplary embodiment, clad wire produced by Anomet Products, Inc. of Shrewsbury, Mass. can be used to produce soldering iron tips according to techniques disclosed herein.

Figure 6:
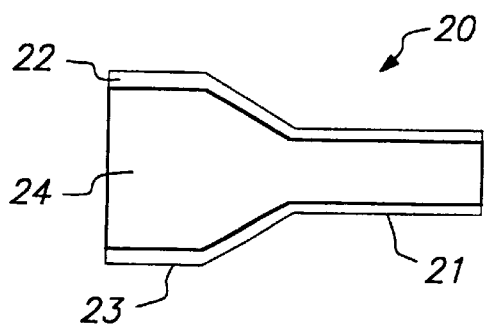
Figure 7:
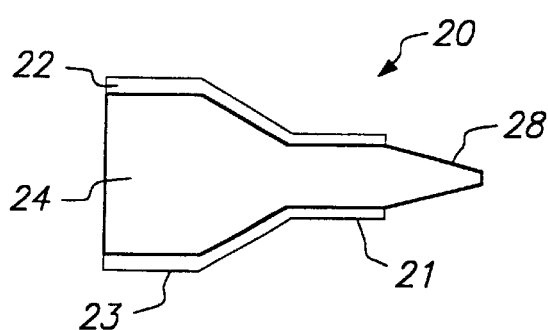

A semi-finished tip produced by the clad wire segment 20 is shown in FIG. 6 (in cross-section depiction), while a finished tip produced by the clad wire segment 20 is shown in FIG. 7 (in cross-section depiction). Referring to FIG. 7, the tip has a cylindrical portion 23 joined to a cylindrical portion 21 of smaller diameter. The portion 21 terminates in a tapered working area 28. The outer layer 22 of the clad wire covers the underlying copper core 24, except for the working area 28 of the tip.

In the finished soldering iron tip, the protective outer layer 22 serves a number of purposes. First, the layer 22 protects the underlying copper core 24 from corroding in the air. Second, the outer layer 22 provides a good electrical contact between the tip and ground, which, in turn, prevents a voltage from building up between the tip and ground which could discharge during soldering operations and damage the components to which solder is being applied. In the case of soldering electrical components, military specifications require a tip-to-ground voltage potential of no more than 2 millivolts (mv) and tip-to-ground resistance of no more than 2 ohms. Third, the outer layer 22 offers relatively poor wettability by solder, and thereby prevents solder from advancing past the working area of the soldering iron tip. Generally, the use of the clad wire or rod as a starting material eliminates the need to form the protective outer layer 22 by electroplating at a later stage in the production of the tip, and therefore eliminates the above-described drawbacks of electroplating.

2. Formation of an Integrated Heater Element

Figure 8:
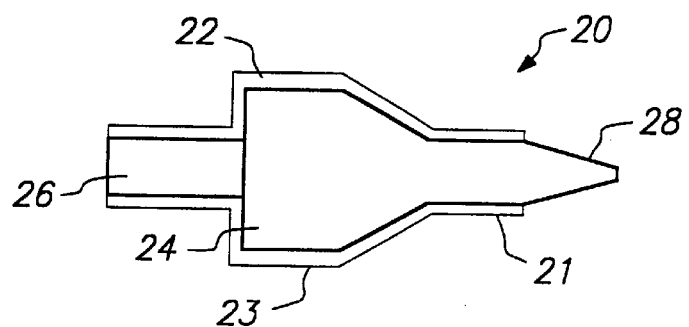

Another aspect of the invention involves the formation a heater element which is integral with the soldering iron tip. For example, as shown in FIG. 8, the finished tip (or semi-finished tip) with an integral heater includes a cylindrical portion 23 sandwiched between the cylindrical portion 21 and a heater element 26 (as shown in cross-section depiction). The heater element 26 and the tip itself are formed from the same clad wire (or rod) segment 20. As such, there is metallurgical continuity between the heater 26 and the tip, which facilitates the transfer of thermal energy from the heater 26 to the tip. The outer layer 22 from the clad wire covers the tip, including the heater 26, but does not cover the tapered end portion 28 of the tip.

As mentioned above, the protective layer 22 can comprise, but is not limited to, stainless steel, high purity nickel, high purity chromium, or some alloy thereof, such as Fe—Ni (e.g. Invar-type alloys), Fe—Ni—Cr, or other suitable material. More specifically, Invar-type alloys of different compositions can be selected to provide different soldering iron power load capacities. For example, progressively greater power loads can be supplied by layers of: (1) 42% Ni, 6% Cr, 52% Fe; (2) 42% Ni, 58% Fe; (3) 44% Ni, 56% Fe; and (4) 52% Ni, 48% Fe.

3. Manufacture of a Soldering Iron Tip Using Metal Forming

Those skilled in the art will appreciate that there are many techniques for transforming the clad wire (or rod) segment 20 shown in FIG. 5 into a desired tip geometry (such as the tip shapes shown in FIGS. 6, 7 or 8), including machining the wire or rod segment 20 into the desired shape. Alternatively, according to the present invention, a metal forming process, such as cold or hot heading can be used to manufacture the tip.

Figure 9:
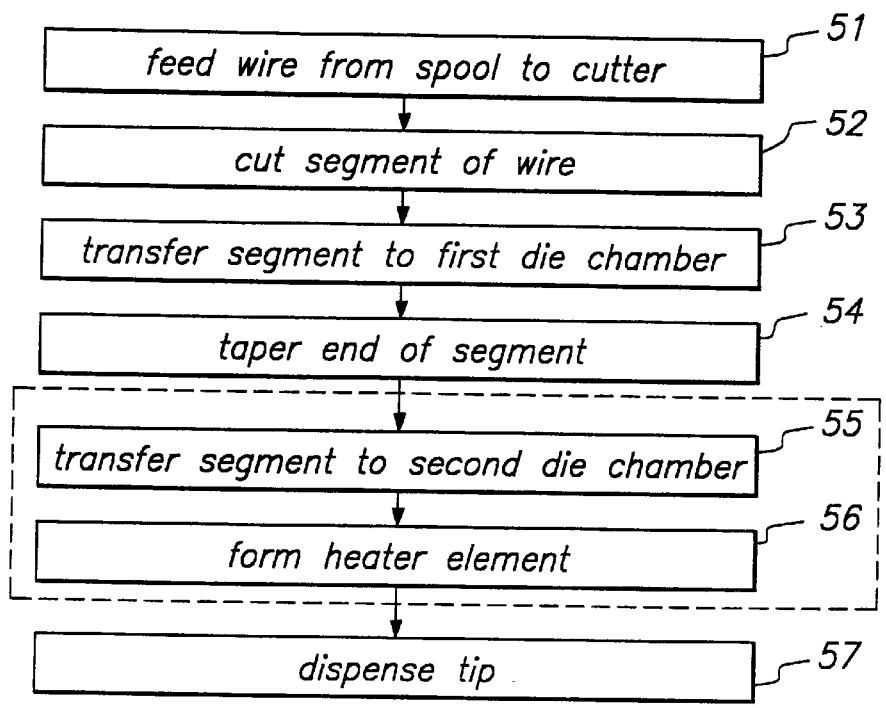
FIG. 9 shows an exemplary technique for shaping the clad wire segment.

FIG. 9 illustrates one exemplary technique employing a cold heading process for transforming a wire segment into a finished or semi-finished tip. The exemplary technique begins by feeding a length of clad wire from a spool of wire to a cutter (step S1), which cuts off a segment of the wire of prescribed length (step S2). Following the cutting operation, the segment is then transported to a first die chamber (step S3), where one or more dies deliver one or more blows to taper one end of the segment (step S4) to shape a portion 21 having a reduced diameter, as shown in FIG. 6, which is then further processed to shape a tapered working area 28, as shown in FIG. 7. Cold heading per se is well understood in the art and thus the details of such a process will be evident to those skilled in this art. By way of example, U.S. Pat. Nos. 3,669,334, 3,934,293, 4,058,865, and 5,146,668 provide exemplary details of typical cold heading machinery and techniques for shaping wire segments. These patents are incorporated by reference herein.

The process can skip steps S5 and S6, upon which the part is dispensed in step S7. At this stage in the manufacture of the tip, the protective layer 22 can be removed from the working area 28 of the tip by machining or like technique. A protective layer can be added to the working area 28 at some later stage of production using any suitable technique, such as by using electroplating, or by fitting a cap onto the working area 28 (to be discussed later).

If an integral heater is desired, the tip shown in FIG. 7 can be transported to a second die chamber (step S5), where another die delivers one or more blows to form the heater element 26 at one end of the tip (step S6), as shown in FIG. 8, thus producing the finished tip with an integrated heater 26. The finished tip is dispensed in step S7. Steps S5 and S6 are enclosed in a broken-line box to illustrate that they can be omitted to produce a tip without an integrated heater, if desired.

Alternative methods for constructing the tip include using a hot heading process (instead of a cold heading process), or forming the heater 26 prior to forming the portions 21, 28, or forming the heater 26 at the same time as the portions 21, 28 (e.g. through the simultaneous application of plural blows from plural dies). The exemplary steps shown in FIG. 9 can be fully automated, or may require manipulation of parts and/or machinery by a human operator. Furthermore, the tip portions (e.g. portions 21, 23) can be formed having any desired geometry.

The process discussed above shapes the, clad wire segment 20 shown in FIG. 5. However, the technique can also be used to shape wire segments which do not have an outer protective layer 22. In this embodiment, the protective layer 22 could be subsequently formed on the shaped tips through electroplating or like technique.

4. Formation of an Outer Layer Cap on the Working Area of the Tip

Figure 10:
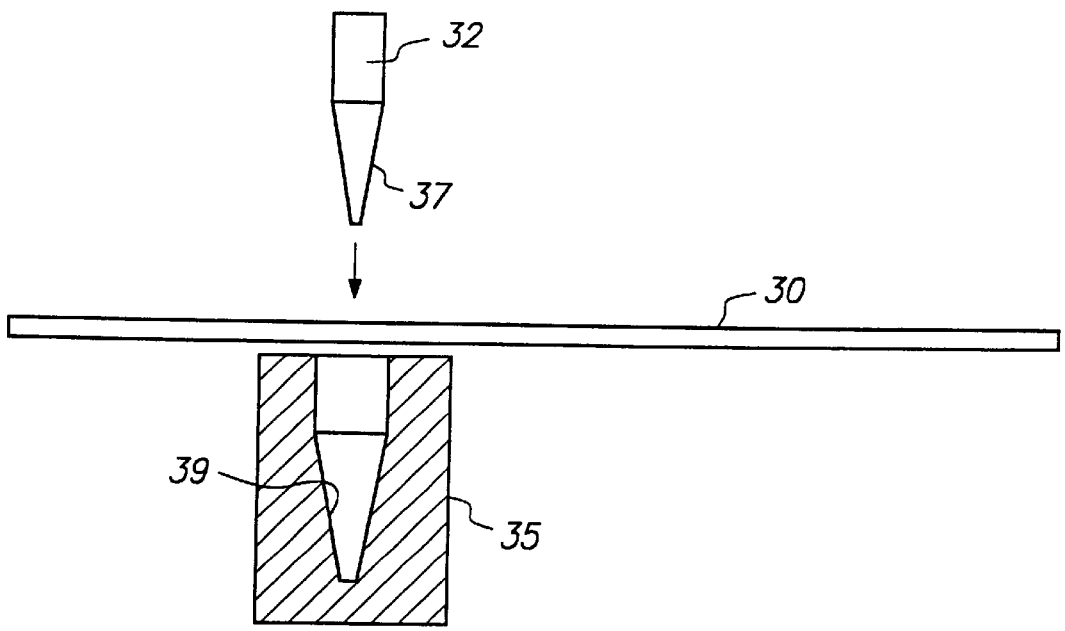
FIG. 10 shows an exemplary technique for making a soldering iron cap according to a second embodiment of the invention.
Figure 11:
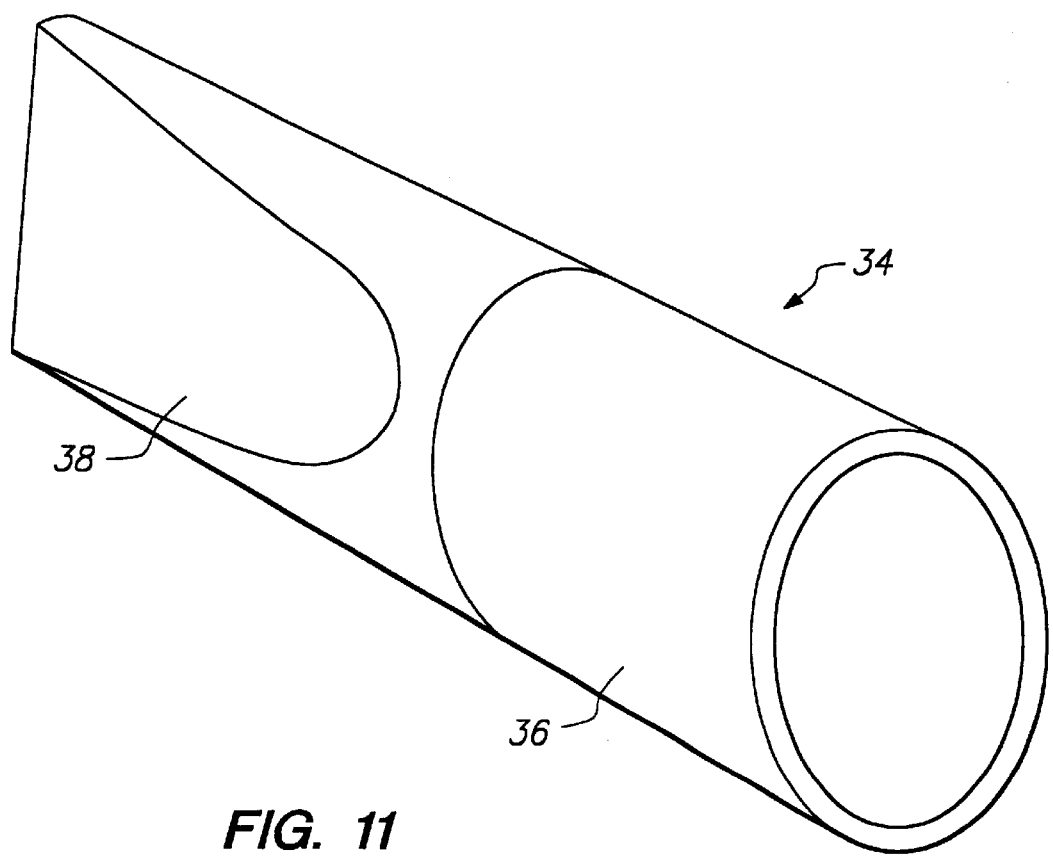
FIG. 11 shows an exemplary perspective view of the soldering iron cap produced by the technique shown in FIG. 10.
Figure 12:
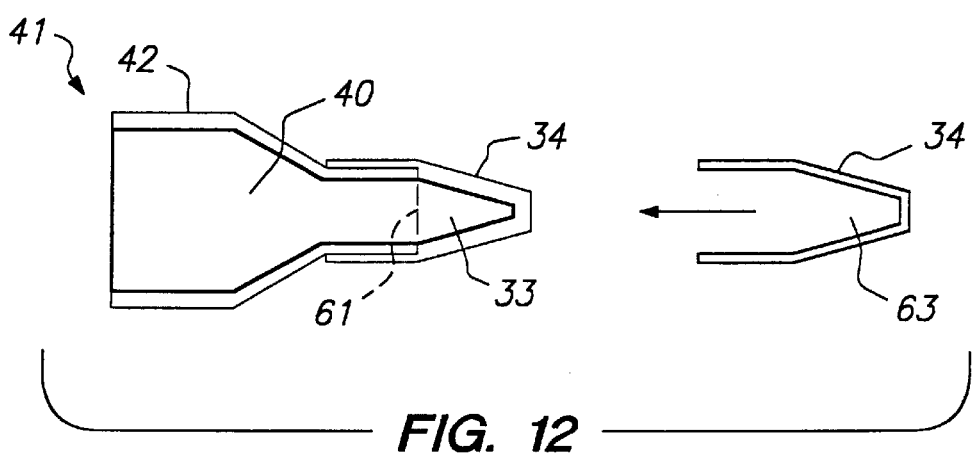
FIG. 12 shows an exemplary manner of attaching the cap to the soldering iron tip.

FIGS. 10–12 illustrate another aspect of the present invention for forming a hardened outer layer on the working area of the tip. The technique shown in FIGS. 10 through 12 has wide applicability to many types of tips produced by various techniques. For example, the technique shown in FIGS. 10 through 12 can be used to supply a hardened outer layer on-the exposed end 28 of the soldering iron tip produced by the method described with reference to FIGS. 5 through 9, or can be used to supply a hardened outer layer for machined copper cores, such as the machined core 2 shown in FIG. 1.

As shown in FIG. 10, a continuous thin strip of material 30 is produced (e.g. a strip having a thickness of about 0.5 mils). According to exemplary embodiments, the material can comprise iron of high purity (e.g. iron having a purity of 99.5% in one exemplary embodiment), nickel, or other material or alloy. Thereafter, a plurality of caps 34 are stamped out using die 32 which mates with die 35. Only one pair of dies (32, 35) has been shown to facilitate discussion, although plural pairs of dies (32, 35) can be used. The die 32 has an outer contour 37 which defines the inner contour of the cap 34, while the die 35 has a recess having a contour 39 which defines the outer geometrical shape of the cap 34. FIG. 11 shows one such exemplary shaped cap 34, having a tapered end 38 and a cylindrical portion 36. The cap 34 can alternatively be formed by other techniques such as, but not limited to, a deep drawing process.

The cap 34 is then inserted over the working area 33 of a tip 41 in the manner shown in FIG. 12. The cap 34 is preferably secured to the tip 41 by a metallurgical bonding technique such as brazing, or like technique. For example, a small amount (e.g. about 0.2 mils) of high purity silver or "CUSIL" (72% Ag, 28% Cu) can be applied to a mating surface of either the stamped cap 34 or the tip 41, and then melted or sintered to metallurgically bond the cap to the tip. Alternatively, to further promote efficiency in production, the brazing material can be applied to the strip of material 30 before stamping. During melting, the silver and copper form a CuAg eutectic which bonds the cap to the tip.

As an alternative to stamping the cap 34 from a sheet of material such as iron, the cap may be produced by cold heading or forming segments of wire or metal shapes (e.g. spheres) into the desired tapered shape. The details of such a process will be evident to those having skill in this art, and thus will not be discussed in further detail. By way of example, U.S. Pat. No. 3,669,334 discloses one such technique.

The finished soldering iron tip 41 shown in cross-section depiction in FIG. 12 comprises a copper core 40 having a tapered working area end 33. The cap 34 is inserted over the working area end 33. The cap 34 can contact another layer 42 (or series of layers). These additional layers 42 can be formed by any suitable technique. For instance, these layers 42 can be formed by the technique shown in FIGS. 5–9, or via electroplating. Alternatively, these layers 42 can themselves be separately formed as caps and inserted over the core 40 prior to inserting the cap 34, such that the tip has a plurality of overlapping caps. In any event, these layers 42 preferably have low wettability by solder and provide low tip-to-ground potential, as previously described. Finally, while the tip 41 shown in FIG. 12 does not include an integrated heater, this technique can be used to furnish caps 34 for tips which include integrated heaters (such as the tip shown in FIG. 8).

According to the exemplary embodiment shown in FIG. 12, the outer contour of the working area 33 generally matches the inner contour of the cap 34. Alternatively, the terminal end of the tip need not match the inner contour of the cap 34. For example, the terminal end of the tip can be truncated along the line 61, thereby forming an intermediary region between the end of the tip and the cap 34. This intermediary region is filled with a brazing composition (or other metallic substance) to improve the thermal conductivity between the tip and the cap 34.

More specifically, in one embodiment, an amount of brazing material is added to the inside 63 of the cap 34 before fitting the cap 34 onto the end of the tip. The brazing material can be applied to the interior of the cap in a paste, solid or powder form, or some other form. Once applied, the cap 34 (with brazing material disposed therein) is heated to melt or sinter the brazing material, thereby bonding the brazing material to the inside of the cap at its distal end. After the cap 34 cools, the cap is inserted over the end the tip, and attached thereto by a suitable technique, such as, brazing or sintering.

In yet another embodiment, the cap 34 can be secured to the end of the tip before the brazing material cools, such that the brazing material is still in a melted form, or at least still soft. This technique further ensures that the junction between the end of the tip and the cap does not contain air gaps. Still other forms of the invention entail securing the cap 34 to the end of the tip and then adding the brazing material to the interior cavity between the cap 34 and the tip through a hole in the cap (not shown), for example.

5. Formation of the Outer Layer on the Working Area Using Clad Wire

Figure 13:
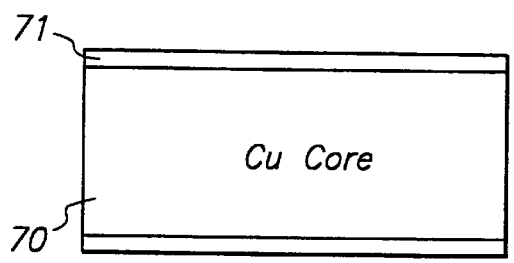
FIGS. 13–14 show the transformation of a clad wire segment to a soldering tip having a protective outer coating on its working area according to another embodiment of the present invention.

Another exemplary embodiment entails producing the soldering iron tips (or desoldering iron tips) having an outer layer on the working area of the tip from a clad wire segment or a clad rod segment. As shown in FIG. 13 in cross-section depiction, in this embodiment, the clad wire (or rod) segment comprises a core of material 70 made of copper or a copper alloy. The protective layer 71 can comprise, but is not limited to, high purity iron, nickel, or like material or alloy.

Figure 14:
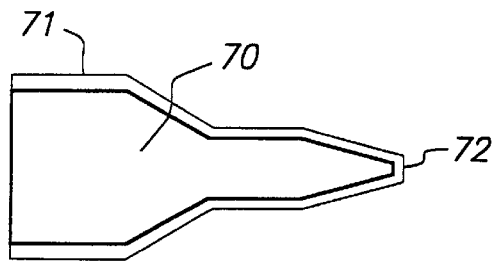

This segment can be shaped or formed according to any of the techniques discussed above into a desired tip geometry, such as the exemplary tip geometry shown in FIG. 14 in cross-section depiction. As shown in FIG. 14, the tip includes a copper core 70 having an outer layer 71 (e.g. comprising iron) covering substantially the entire surface of the tip, including the working area 72. The outer layer 71 can be joined at the distal end of the working area 72 by any suitable technique, such as by crimping the distal end of the working area 72. Furthermore, although not shown, additional layers can be formed on the outer layer 71, such as a layer having the properties discussed above in the context of FIG. 5 (including, but not limited to high purity nickel, high purity chromium, or some alloy thereof, such as Fe—Ni or other Invar-type alloys, Fe—Ni—Cr, stainless steels or other suitable material). These additional layers can be formed on the outer layer 71 by any suitable technique, such as electroplating.

Figure 15:
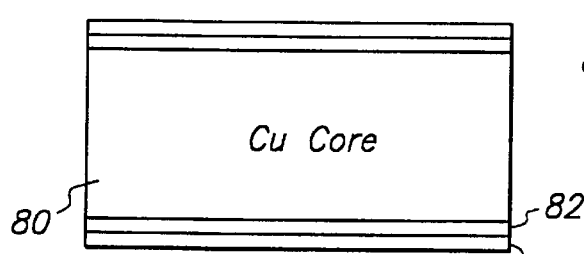
FIGS. 15–17 show the transformation of a clad wire segment having at least two outer layers to a soldering tip having a multilayered outer coating according to yet another embodiment of the present invention.

Instead of electroplating additional layers onto the layer 71, yet another embodiment of the present invention entails forming a tip having two or more outer layers by shaping or forming a clad wire segment having two or more outer layers, as shown in FIG. 15 in cross-section depiction. More specifically, the clad wire (or rod) segment shown in FIG. 15 comprises a core of material 80 made of a metal such as copper or a copper alloy. A first clad layer 82 comprises, but is not limited to, high purity iron, nickel, or like material or alloy. A second outer clad layer 84 can comprise, but is not limited to, high purity nickel, high purity chromium, or some alloy thereof, such as Fe—Ni or other Invar-type alloys, Fe—Ni—Cr, stainless steels or other suitable material.

Figure 16:
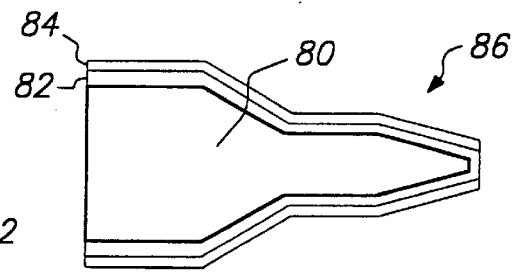
Figure 17:
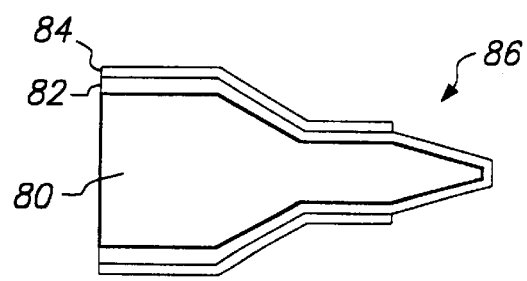

This segment can be shaped or formed according to any of the techniques discussed above into a desired tip geometry, such as the exemplary tip geometry shown in FIG. 16. As shown in FIG. 16 in cross-section depiction, the tip includes the copper core 80 having outer layers 82 and 84 covering substantially the entire surface of the tip, including the working area 86. The outer layer 84 can be removed to reveal the outer layer 82 (formed of, for example, iron) at the working area 86, as shown in FIG. 17 in cross-section depiction. The outer layer 84 can be removed by any suitable technique, such as machining.

The above-described exemplary embodiments are intended to be illustrative in all respects, rather than restrictive, of the present invention. Thus, the present invention is capable of variations in detailed implementation that can be derived from the description contained herein by a person skilled in the art. All such variations and modifications are considered to be within the scope and spirit of the present invention as defined by the following claims.

What is claimed is:

1. A soldering iron tip comprising:
   a soldering tip comprising a metal core member made of a clad rod or wire which has an outer clad layer on a core material having a high thermal conductivity, said metal core member having a first tapered working end, and a second end, opposite to the first end, said outer clad layer being metallurgically bonded to at least a portion of said metal core member, and
   a cap covering at least said tapered working end, said cap being metallurgically bonded to said tapered working end, wherein said cap overlaps a portion of the clad layer and said cap consists essentially of a mechanically deformed iron, or iron alloy sheet.

2. The soldering iron tip of claim 1, wherein said clad layer is located behind the tapered end and provides low tip-to-ground potential or resistance, and protects at least a portion of said metal core member from corrosion in air or dissolution by solder.

3. The soldering iron tip of claim 1, wherein said clad layer consists essentially of stainless steel, nickel, chromium, a nickel alloy, an iron-nickel alloy, or a chromium alloy.

4. The soldering iron tip of claim 2, wherein said clad layer consists essentially of stainless steel, nickel, chromium, a nickel alloy, an iron-nickel alloy, or a chromium alloy.

5. The soldering iron tip of claim 1, wherein said clad layer is not disposed over at least said working end.

6. The soldering iron tip of claim 1, wherein the cap is made by cold heading or forming segments of wire or metal shapes.

7. The soldering iron tip of claim 2, wherein the clad layer protects at least a portion of said metal core member proximal to the working end.

8. The soldering iron tip of claim 1, wherein the second end of the metal core member comprises an integral heater element and wherein the heater element and the tapered working end of said metal core member are arranged so as to promote thermal transfer of energy between said heater element and said first tapered working end of said metal core member.

9. The soldering iron tip of claim 8, wherein said clad layer is disposed over said heater element but not over said first tapered working end.

10. The soldering iron tip of claim 8, wherein the heater element comprises a cylindrical section of smaller diameter than an adjacent cylindrical section located between the heater element and the tapered working end.

11. A soldering iron tip comprising:

a soldering tip comprising a metal core member made of a clad rod or wire which has a clad layer on a core material having a high thermal conductivity, said metal core member having a first tapered working end, and a second end, opposite to the first end, said outer clad layer being metallurgically bonded to at least a portion of said metal core member;

the second end of the metal core member comprising an integral heater element and wherein the heater element and the tapered working end of said metal core member are arranged so as to promote thermal transfer of energy between said heater element and said first tapered working end of said metal core member, the heater element comprising a cylindrical section of smaller diameter than an adjacent cylindrical section located between the heater element and the tapered working end, said clad layer being disposed over said heater element but not over said first tapered working end; and a cap covering at least said tapered working end, said cap being metallurgically bonded to said tapered working end, wherein said cap overlaps a portion of the clad layer, said cap consisting essentially of a mechanically deformed iron sheet or a mechanically deformed iron alloy sheet.

* * * * *